United States Patent [19]

Killop

[11] Patent Number: 4,829,800

[45] Date of Patent: * May 16, 1989

[54] METHOD AND APPARATUS FOR COLD SIZING A ROUND WORKPIECE HAVING MULTIPLE DIAMETERS

[75] Inventor: James T. Killop, Warren, Mich.

[73] Assignee: Anderson-Cook, Inc., Fraser, Mich.

[ * ] Notice: The portion of the term of this patent subsequent to Dec. 15, 2004 has been disclaimed.

[21] Appl. No.: 220,984

[22] Filed: Jul. 15, 1988

Related U.S. Application Data

[60] Continuation of Ser. No. 79,889, Jul. 31, 1987, abandoned, Division of Ser. No. 787,273, Oct. 15, 1985, Pat. No. 4,712,410, Continuation of Ser. No. 458,325, Jan. 17, 1983, abandoned.

[51] Int. Cl.⁴ .......................... B21B 1/08; B21B 27/00
[52] U.S. Cl. ............................................ 72/108; 72/88
[58] Field of Search ...................... 72/88–92, 72/102–104, 108

[56] References Cited

U.S. PATENT DOCUMENTS

| Re. 22,737 | 4/1946 | Bailey | 72/90 |
|---|---|---|---|
| 3,495,428 | 2/1970 | Marcovitch | 72/91 |
| 4,155,236 | 5/1979 | Jungesjo | 72/88 |

FOREIGN PATENT DOCUMENTS

| 2261154 | 12/1973 | Fed. Rep. of Germany | 72/108 |
|---|---|---|---|
| 3127392 | 4/1982 | Fed. Rep. of Germany | 72/108 |
| 18746 | 9/1967 | Japan | 72/103 |

Primary Examiner—Robert L. Spruill
Attorney, Agent, or Firm—Reising, Ethington, Barnard, Perry & Milton

[57] ABSTRACT

An apparatus (12) for cold sizing a round workpiece (14) having round surfaces of cylindrical shapes that are coaxial about a central axis A of the workpiece and have different diameters. A support (54,55) rotatably mounts the workpiece (14) about its central axis A between a pair of die assemblies (24a, 24b) which are spaced from each other. Each die assembly (24a,24b) includes a plurality of dies (56,58,60,62) that are respectively aligned with the round surfaces (46,48,50,52) of the workpiece (14). Movement of the die assemblies in opposite directions as each other engages sizing surfaces (66,68,70,72) of the dies with the aligned round surfaces of the workpiece to pressure size the workpiece surfaces. In one embodiment of the sizing apparatus (12), the die assemblies (24a, 24b) have elongated shapes and are moved rectilinearly in a parallel relationship to each other to perform the sizing. Another rotary embodiment of the sizing apparatus (12') includes rotary die assemblies (24a',24b') mounted by associated spindles (85) whose rotation likewise pressure sizes the round workpiece surfaces. Both embodiments of the sizing apparatus are disclosed as including forming projections for forming projections such as splines (82) and/or a helical thread (84) on the sized surfaces of the workpiece.

4 Claims, 2 Drawing Sheets

METHOD AND APPARATUS FOR COLD SIZING A ROUND WORKPIECE HAVING MULTIPLE DIAMETERS

This application is a continuation of application Ser. No. 079,889, filed 7-31-87, now abandoned, which is a divisional of Ser. No. 787,273, filed 10/15/85 now U.S. Pat. No. 4,712,410; which is a continuation of Ser. No. 458,325, filed 1/17/83 (now abandoned).

TECHNICAL FIELD

This invention relates to an apparatus for cold sizing a workpiece having multiple diameters.

BACKGROUND ART

Round metal parts are conventionally accurately sized after an initial turning operation by a subsequent grinding operation in order to provide the required tolerance for the application for which the workpiece is to be utilized. For example, universal joints for vehicle drives conventionally include a joint member having four round surfaces of cylindrical shapes that are coaxial about a central axis of the joint member and have different diameters. The largest round surface is utilized with a seal to provide sealing of the joint, while the next largest round surface supports a bearing that mounts the joint. Both of the two smaller round surfaces are subsequently formed with projections, the larger one with splines utilized to rotatively couple the joint and the smaller one with a thread used in securing the joint in position. Grinding of these round surfaces on such joint members is both time consuming and costly but has been necessary in the past to provide the required roundness for accommodating the seal and bearing utilized as well as for providing the required roundness prior to the spline and thread forming.

A cooperable pair of movable tools has also been utilized in the past to cold form noncylindrical workpieces. See, for example, U.S. Pat. Nos. 419,292, 446,934, 1,446,447, 1,569,174, 3,044,332, 3,466,918, 3,498,095, and 3,503,237 which disclose such forming.

Hot forming of an axle having round surfaces of cylindrical shapes with different diameters is disclosed by U.S. Pat. No. 458,685 wherein a pair of straight tools are moved rectilinearly on opposite sides of the hot axle to provide the forming operation.

U.S. Pat. No. 625,575 discloses a pair of straight tools that are moved rectilinearly to cold form a workpiece having a single cylindrical surface of a round shape.

Also, U.S. Pat. No. 2,825,251 discloses a pair of tools used to perform forming by holding one of the tools stationary and moving the other one with the workpiece between the two tools.

DISCLOSURE OF INVENTION

An object of the present invention is to provide an improved apparatus for cold sizing a workpiece having a central axis and a plurality of round surfaces of cylindrical shapes that are coaxial about the central axis and have different diameters.

In carrying out the above object, the operation of the subject apparatus is performed by mounting the workpiece for rotation about its central axis between a pair of die assemblies. Each of the die assemblies utilized includes a plurality of dies having sizing surfaces that extend parallel to the central axis of the workpiece respectively in alignment with the round surfaces of the workpiece. Movement of the die assemblies in opposite directions as each other engages the sizing surfaces of the dies with the round surfaces of the workpiece as the workpiece rotates about its central axis such that the sizing surfaces pressure size the round surfaces of the workpiece.

Pressure sizing of the workpiece can be performed by two different preferred ways in which the method is practiced. In one preferred practice of the method, the die assemblies are moved rectilinearly in opposite directions as each other and the dies thereof are provided with flat sizing surfaces that engage the round surfaces of the workpiece at diametrically opposite locations. In another preferred practice of the method, the die assemblies are rotated and the dies thereof have round sizing surfaces that engage the round surfaces of the workpiece at diametrically opposite locations.

It is also possible to continue the movement of the die assemblies in order to engage forming projections on the trailing end of one die of each die assembly with the aligned round surface of the workpiece to thereby form projections on this aligned round surface of the workpiece. Such projection forming can be utilized to provide splines on one of the round surfaces and can also be utilized to subsequently provide a helical thread on another round surface of the workpiece.

Splines are formed on one of the round surfaces of the workpiece and a helical thread is formed on another round surface during successive operations after the initial sizing. It should be noted that only one round surface of the workpiece can be formed with projections at any given time due to the fact that the round surfaces have different speeds of circumferential movement for any given rate of workpiece rotation and the die assemblies can each only have a single speed at any given time due to their meshed relationship with the workpiece at the projections being formed. To perform sizing and subsequent projection forming of certain types of workpieces, a particular machine with which the apparatus is utilized may not have sufficient die length to permit the complete operation to be performed during a single movement of the die assemblies in opposite directions as each other. In such cases, the workpiece can be axially shifted to engage one of the round surfaces with forming projections on one die of each die assembly as the direction of movement is reversed.

It should be noted that during the initial sizing operation, sliding takes place between at least one of the round surfaces of the workpiece and the associated dies due to difference in speeds thereof with the die assemblies moving only at a single speed. This is possible due to the fact that the sizing performed by the die assemblies initially only forms cylindrical shapes that do not present any interlocking relationship with the sizing surfaces of the dies of the die assembly. However, during subsequent forming of workpiece projections, the meshed relationship of the die projections and the workpiece projections being formed prevents forming of projections on more than one round surface of the workpiece at any given time as previously mentioned.

The object of the invention is carried out by the apparatus that is utilized to cold size the workpiece. This apparatus includes a support for rotatably mounting the workpiece about its central axis and also includes a pair of die assemblies mounted for movement with the workpiece between the die assemblies. Each die assembly of the apparatus includes a plurality of dies respectively aligned with the round workpiece surfaces of different diameters. Each die has a sizing surface that extends parallel to the workpiece axis and engages the aligned round surface of the workpiece upon movement of the die assemblies as the workpiece rotates about its central axis such that the sizing surfaces pressure size the round surfaces of the workpiece.

In one preferred embodiment disclosed, the pair of die assemblies have elongated shapes and have dies with flat sizing surfaces. These elongated die assemblies are mounted for rectilinear movement in a parallel relationship to each other to perform the pressure sizing of the round surfaces of the workpiece locations. A machine including lower and upper bases that define a work space there between is preferably utilized to mount the elongated die assemblies for their rectilinear movement in a parallel relationship to each other. Suitable slideways provided on the upper and lower bases of the machine respectively mount the pair of elongated die assemblies for such rectilinear movement in the parallel relationship.

Another preferred embodiment of the apparatus includes a pair of rotary die assemblies having dies with round sizing surfaces. These rotary die assemblies are respectively mounted by a pair of spindles for rotary movement to perform the pressure sizing of the round surfaces of the workpiece at diametrically opposite locations. Each spindle is disclosed as including a clamp mechanism that clamps the rotary dies of the associated die assembly to perform the pressure sizing upon spindle rotation.

In both preferred embodiments of the apparatus, one of the dies of each die assembly includes a trailing end having projections for forming projections in the aligned round surface of the workpiece. Such projections can be provided on the trailing ends of different dies of each die assembly but at different locations along the length thereof in order to permit successive forming of the projections on different round surfaces of the workpiece such as the spline and thread forming previously discussed.

It should be mentioned that only a relatively small reduction takes place in the diameters of the round surfaces of the workpiece as the pressure sizing is performed. Such diameter reduction is always less than twenty thousandths of an inch and preferably less than ten thousandths of an inch. In the most preferred practice of the invention, the diameter reduction during the pressure sizing is only on the order of about four to six thousandths of an inch. This latter range in diameter reduction has been found to give accurate sizing of the round surfaces even with the relative sliding that takes place between the dies and certain of the round workpiece surfaces due to the different rates of speed as previously mentioned.

Also, it should be noted that the dies of each die assembly are disclosed as being separable from each other since this is the easiest and hence most economical way to manufacture the die assembly. However, in certain applications, it may be possible to utilize a die assembly wherein the dies are all made unitary with each other. Such unitary die assemblies would be more difficult to manufacture and hence more costly but, nevertheless, could be used to practice the invention.

The objects, features, and advantages of the present invention are readily apparent from the following detailed description of the best modes for carrying out the invention when taken in connection with the accompanying drawings.

BEST MODES FOR CARRYING OUT THE INVENTION

Figure 1:
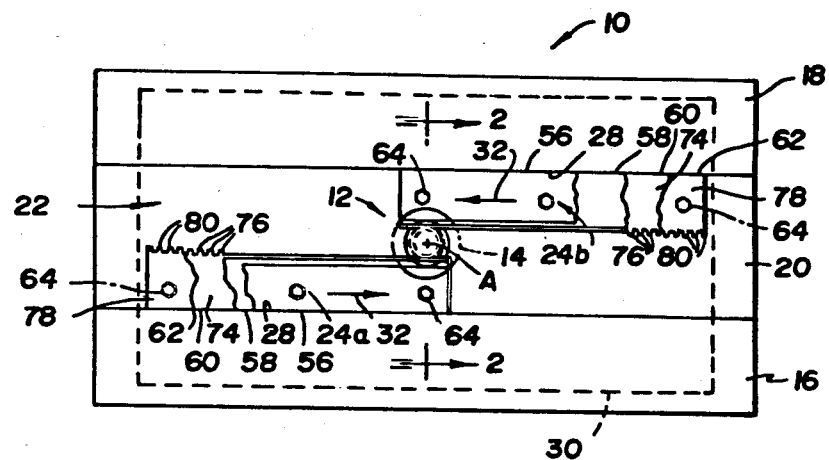
FIG. 1 is a schematic front view of a machine including apparatus constructed in accordance with the invention to perform the cold sizing method thereof on a round workpiece.

With reference to FIG. 1 of the drawings, a schematically illustrated machine is generally indicated by reference numeral 10 and includes apparatus 12 constructed in accordance with the present invention to cold size a round workpiece 14 at room temperature as is hereinafter more fully described. Machine 10 includes a lower base 16, an upper base 18, and a rear connection portion 20 that cooperatively define a work space 22 in which the sizing apparatus 12 is located. Elongated lower and upper die assemblies 24a and 24b are respectively mounted on the lower and upper bases 16 and 18 by suitable slides 26 (FIG. 2) that are movable along slideways 28 of the bases. These slideways 28 extend in a parallel relationship to each other as shown in FIG. 1 such that operation of a schematically indicated drive mechanism 30 moves the die assemblies 24a and 24b in a parallel relationship to each other as illustrated by arrows 32. Drive mechanism 30 may be of any suitable type such as, for example, the one disclosed by U.S. Pat. No. 3,793,866.

Figure 2:
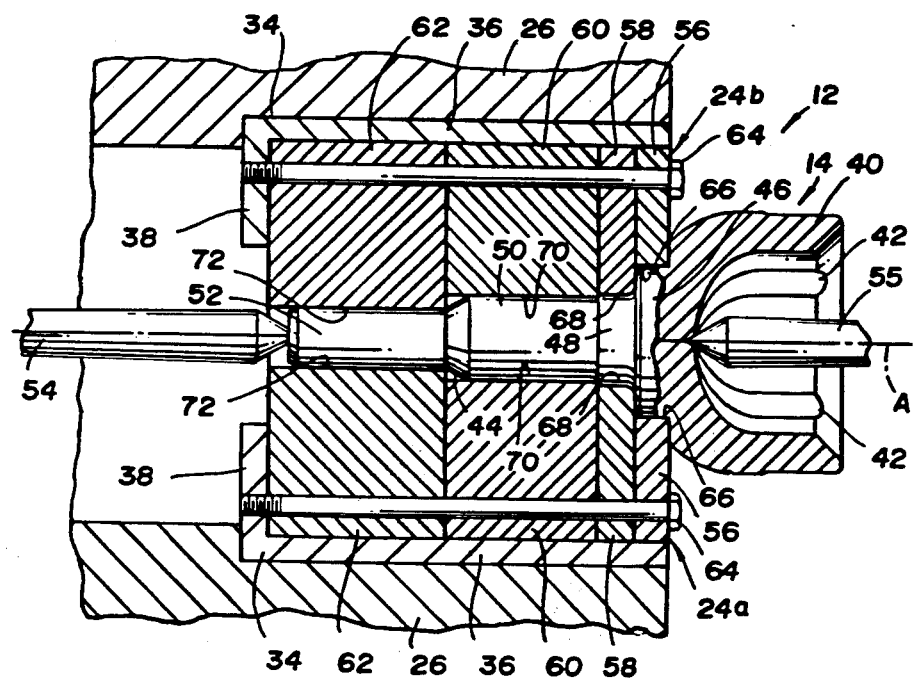
FIG. 2 is a sectional view taken along the direction of line 2—2 in FIG. 1 to illustrate elongated die assemblies which are moved rectilinearly in opposite directions as each other to perform tne cold sizing operation.

As seen in FIG. 2, a pair of tool boxes 34 are respectively mounted on the pair of slides 26 above and below the workpiece 14. Each tool box 34 includes horizontal and vertical legs 36 and 38 for providing vertical and lateral support to dies of the die assemblies 24a and 24b as is hereinafter more fully described.

As illustrated in FIG. 2, the round workpiece 14 is shown as the female member of a universal joint of the type used in vehicle drives. This universal joint member 14 has a central axis A and includes a cup shaped end 40 whose interior has grooves 42 for receiving balls that provide a coupling thereof to a male joint member which is not shown. A shaft 44 of joint member 14 projects toward the left from its cup-shaped end 40 and includes round surfaces 46, 48, 50 and 52. These round surfaces have cylindrical shapes that are coaxial about the central axis A of the joint member 14 and have different diameters than each other. The largest diameter round surface 46 immediately adjacent the cup shaped end 40 of the joint member 14 is used to mount a seal that is used with the joint, while the next smaller round surface 48 receives a bearing that is utilized to mount the joint member during use. As is hereinafter more fully described, the round surface 50 which is just slightly smaller than the round surface 48 is ultimately provided with splines to couple the joint during use. The smallest round surface 52 is ultimately provided with a helical thread for receiving a suitable nut that secures the joint member in position during use.

As illustrated in FIG. 2, apparatus 12 includes a workpiece support having a headstock center 54 and a tailstock center 55 that rotatably mount the workpiece 14 about its central axis A. Headstock center 54 is mounted in a suitable manner on the connecting portion 20 of the machine 10 illustrated in FIG. 1, while the tailstock center 55 is mounted in a suitable manner on an unshown arm that projects forwardly from either the lower base 16 or the upper base 18 of the machine.

As illustrated in FIG. 2, each of the pair of die assemblies or members 24a and 24b includes a plurality of dies 56, 58, 60, and 62 mounted on the associated tool box 34 for movement with the slide 26 on which the tool box is mounted. Unshown end clamps and/or unshown bolts secure the dies to the horizontal leg 36 of the tool box 34 and cooperate with bolts 64 that secure the dies to the vertical leg 38 of the associated tool box. Dies 56, 58, 60 and 62 have associated opposed pairs of sizing surfaces 66, 68, 70, and 72 of a flat shape that extend parallel to each other and to the central axis A of the rotatably mounted workpiece 14 respectively in alignment with its round surfaces 46, 48, 50, and 42. Operation of the drive mechanism 30 moves the die assemblies 24a and 24b in opposite directions as each other as illustrated by arrows 32 to engage the sizing surfaces 66, 68, 70 and 72 at diametrically opposite locations with the round surfaces 46, 48, 50 and 52 of the workpiece 14 as the workpiece rotates about its central axis A. The spacing between the sizing surface on the lower and upper die assemblies 24a and 24b is such that the round workpiece surfaces 46, 48, 50, and 52 are pressure sized during the die assembly movement to provide accuracy in the roundness thereof as well as removal of surface defects.

It should be noted that during the sizing operation described above, only one of the workpiece surfaces and the aligned die engage each other in a rolling manner, while the other workpiece surfaces are engaged by their aligned dies in a combined rolling and sliding manner. Such sliding along with the rolling accommodates for the difference in speed of the different diameter surfaces and the fact that the die assemblies can only move at a single speed. The particular workpiece surface at which just rolling takes place depends upon the extent of friction generated at the surfaces and the balancing of the resultant torques applied to workpiece 14.

Figure 5:
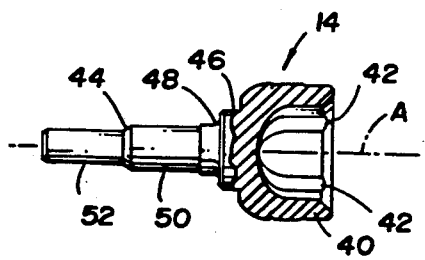
FIG. 5 is a view illustrating the workpiece after cold sizing thereof has been performed.

After the initial sizing, the universal joint member 14 has the construction illustrated in FIG. 5 where its round surfaces 46, 48, 50 and 52 are slightly smaller than the initial size. The reduction in size of the diameters of the round surfaces is very small as it is always less than twenty thousandths of an inch. Preferably, the reduction in the diameters of the round surfaces is less than ten thousandths of an inch and, most preferably, in the range of about four to six thousandths of an inch.

Figure 6:
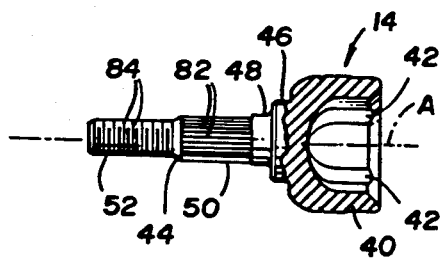
FIG. 6 is a view which illustrates the workpiece after projections in the form of splines and a thread have been formed on its two smallest round surfaces.

As illustrated in FIG. 1, one of the dies 60 of each die assembly includes a trailing end 74 having projections 76 for forming projections in the aligned round surface 50 of the workpiece 14. Similarly, one of the dies 62 of each die assembly includes a trailing end 78 having projections 80 for forming projections in the aligned round surface 52 of the workpiece. As illustrated in FIG. 6, the universal joint member 14 has its round surface 50 provided with projections in the form of splines 82 while the round surface 52 has its projections provided in the form of a helical thread 84. It should be noted that the projections can only be formed on a single round surface of the workpiece at any given time due to the difference in speeds of the different surfaces as previously discussed. Also, with certain machines, there may not be a sufficient stroke length of the die assemblies to provide the sizing and subsequent splining and threading operations. In such case, one or both of the projection forming operations can be performed during a reverse stroking of the die assemblies after first axially shifting the workpiece into alignment with dies having suitable projections for providing the required forming operations after the initial sizing.

After the complete operation, the drive mechanism 30 drives the die assemblies 24a and 24b out of engagement with the completed workpiece 14. This can be done by continuing the movement in the direction of arrows 32 in FIG. 1 or, if no projections are formed, by reversing the direction for return stroking movement back to an end to end relationship of the die assemblies. Upon disengagement of the dies from the workpiece surfaces, the workpiece is removed from between the die assemblies for use or any further processing that may be necessary. If the workpiece removal is performed without any reversal, a return stroking movement must be performed prior to the next cycle.

Figure 3:
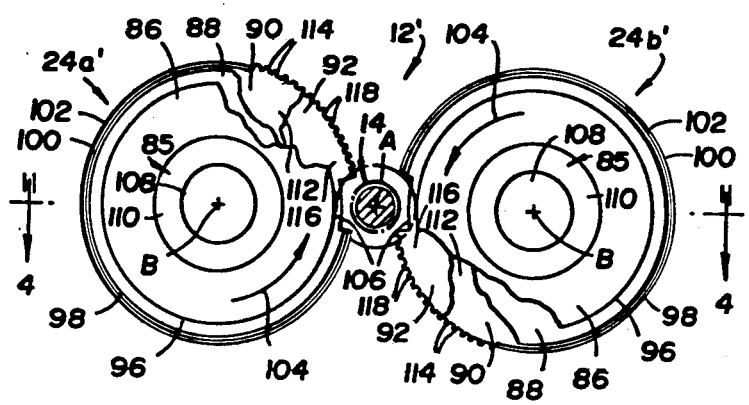
FIG. 3 is a schematic view of another embodiment of apparatus constructed in accordance with the invention to perform the cold sizing method by rotary movement of a pair of rotary die assemblies.
Figure 4:
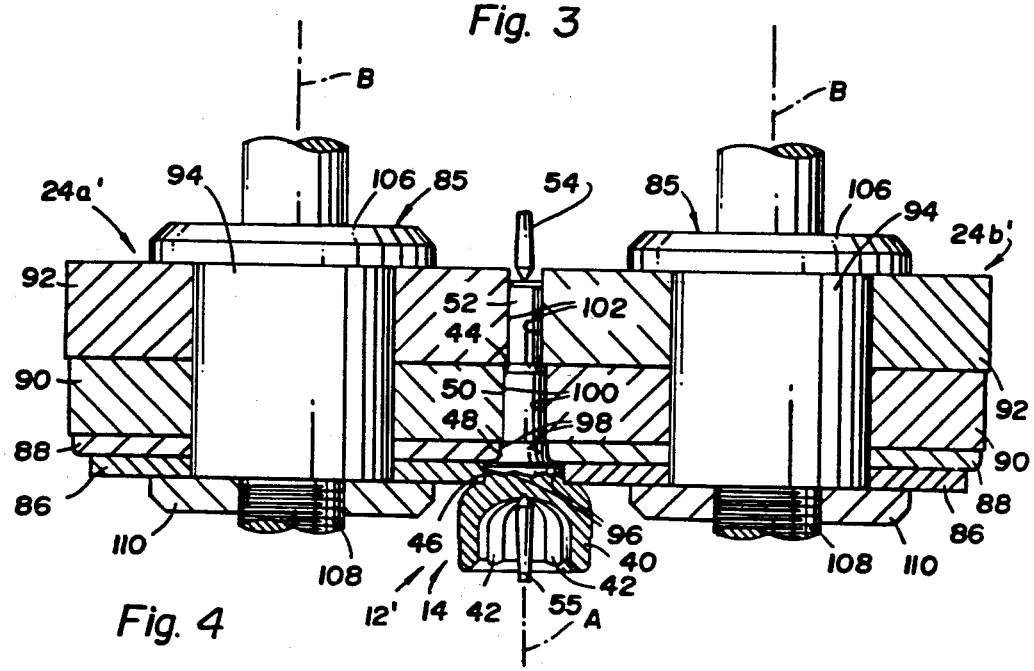
FIG. 4 is a sectional view taken along the direction of line 4-4 in FIG. 3 to illustrate the construction of the rotary die assemblies.

With reference to FIGS. 3 and 4, another preferred embodiment of apparatus constructed in accordance with the invention to provide cold sizing of a round workpiece at room temperature is indicated generally by reference numeral 12' and includes a pair of rotary die assemblies 24a' and 24b' spaced on opposite sides of the workpiece 14. A pair of spindles 85 respectively support the pair of die assemblies 24a' and 24b' for rotation about associated axes B spaced on opposite sides of the workpiece axis A along which the workpiece 14 is rotatably mounted by the support provided by a headstock center 54 and tailstock center 55.

Each of the rotary die assemblies 24a' and 24b' includes a plurality of rotary dies 86, 88, 90, and 92 respectively aligned with the round surfaces 46, 48, 50, and 52 of the workpiece 14. These rotary dies each have an annular shape through whose center a shaft 94 of the associated spindle 85 extends along the axes B about which the rotary die assemblies are rotatively driven in any suitable manner. Rotary dies 86, 88, 90, and 92 have round sizing surfaces 96, 98, 100, and 102 that extend parallel to the central axis A of the workpiece 14 and engage the aligned round surfaces 46, 48, 50, and 52 of the workpiece upon rotary movement of the die assemblies 24a' and 24b' in the clockwise direction as illustrated by arrows 104 in FIG. 3. Suitable notches 106 are provided in the dies to permit the axial positioning of the workpiece 14 therebetween in preparation for the sizing operation performed by the apparatus 12'.

A suitable drive mechanism, such as the general type disclosed by U.S. Pat. No. 4,045,988, drives the rotary spindles 24a' and 24b' of apparatus 12' to engage the round sizing surfaces 96, 98, 100, and 102 of the rotary dies with the aligned round surfaces 46, 48, 50, and 52 of the workpiece 14 as the workpiece rotates about its central axis A. Such engagement of the dies with the workpiece pressure sizes the round surfaces of the workpiece to provide accuracy in the roundness thereof as well as removing surface defects.

Sizing performed by the rotary sizing apparatus 12' of FIGS. 3 and 4 like the linear embodiment previously described only reduces the diameter of the round workpiece surfaces a very small extent which is always less than twenty thousandths of an inch. This diameter reduction with the rotary embodiment like the linear embodiment is preferably less than ten thousandths of an inch and, most preferably, in the range of four to six thousandths of an inch.

With reference to FIG. 4, each of the die spindles 85 includes a flange 106 that engages the adjacent rotary die 92. A threaded portion 108 of each spindle 85 receives a nut 110 that engages the adjacent rotary die 86 to cooperate with the flange 106 in providing a clamp mechanism for clamping the rotary dies in a stacked relationship.

One of the rotary dies 90 of each rotary die assembly 24a' and 24b' includes a trailing end 112 provided with projections 114 for forming projections on the aligned round surface 50 of the workpiece 14. Like the embodiment of FIGS. 1 and 2, the projections formed on the round surface 50 are splines 82 as illustrated in FIG. 6 when the workpiece is a universal joint member 14 of the type previously described. Likewise, one die 92 of each rotary die assembly has a trailing end 116 including projections 118 for forming projections on the round surface 52 of the workpiece 14. These projections 118 are in the form of a helical thread 84 illustrated in FIG. 6 when the workpiece is a universal joint member 14 as previously discussed.

With the rotary embodiment 12' of the sizing apparatus, no return stroke in a reverse direction is necessary as with the linear embodiment of FIGS. 1 and 2. A reduced cycle time can thereby be achieved with the rotary sizing apparatus. Also, the rotary apparatus 12' like the linear apparatus only reduces the diameters of the workpiece surfaces a very small extend as previously described.

It should be appreciated that the invention can be carried out in its broadest practice by sizing of a workpiece having a plurality of round surfaces of different diameters without any subsequent projection forming. However, the apparatus and method disclosed have particular utility when constructed and utilized to perform subsequent projection forming such as the splines and/or thread previously discussed. Separate operations previously required can be eliminated by this single processing of the workpiece to thereby reduce its cost.

It should be appreciated that both embodiments 12 and 12' of the die assemblies can also be constructed with the dies thereof unitary with each other rather than separable as shown. However, it is much easier and hence economical to manufacture the dies separate from each other which is the reason that such a construction is illustrated.

While the best modes for practicing the invention have been described in detail, those familiar with the art to which this invention relates will recognize various alternative ways of practicing the invention as defined by the following claims.

What is claimed is:

1. Apparatus for cold sizing a preformed metal workpiece shaft having a plurality of coaxial cylindrical portions with round surfaces of different diameters by reducing the diameters of the shaft portions from the preformed diameters to simultaneously remove surface defects and provide accuracy in the roundness of the shaft portions, said apparatus comprising: workpiece support means for defining a constant rotary axis of the workpiece and supporting and maintaining the workpiece for free rotation about the workpiece rotary axis but otherwise leaving the workpiece free of axial restraint; a pair of die members each having a plurality of sizing surfaces corresponding in number to the workpiece shaft portions; die member support means supporting said die members so that their respective sizing surfaces are disposed on opposite sides of the workpiece rotary axis in opposed relationship to each other so that each shaft portion can be disposed between a respective one of the opposed pairs of sizing surfaces; each of said sizing surfaces extending parallel to the rotary axis for a distance corresponding to the axial length of the respective shaft portion; said die member support means supporting said die members against movement toward and away from each other as well as toward and away from the workpiece rotary axis, and drive means for moving said die members relative to each other and for causing said sizing surfaces to simultaneously engage and apply pressure to the round surfaces of the respective shaft portions and reduce the diameters thereof by an amount within 20 thousandths of an inch of the preformed diameters while cooperating with said workpiece support means to maintain the concentricity of each coaxial cylindrical portion about said rotary axis.

2. Apparatus as claimed in claim 1 wherein the sizing surfaces are flat and elongated, and the die assemblies are mounted for rectilinear movement in parallel relationship to each other.

3. Apparatus as claimed in claim 1 wherein the die members are mounted for rotary movement and the sizing surfaces thereof are round.

4. Apparatus as claimed in claims 1, 2 or 3 wherein the die members are formed with projection forming die surfaces extending from the trailing ends of one of the opposed pair of sizing surfaces for sequentially forming projections in the respective shaft portion subsequent to the cold sizing of the shaft by the sizing surfaces.

* * * * *

UNITED STATES PATENT AND TRADEMARK OFFICE
CERTIFICATE OF CORRECTION

PATENT NO. : 4,829,800

DATED : May 16, 1989

INVENTOR(S) : James T. Killop

It is certified that error appears in the above-identified patent and that said Letters Patent is hereby corrected as shown below:

Column 1, Line 40
"1,569,174" should be --1,469,174--.

Column 3, Line 12
after "workpiece" insert --by engagement therewith at diametrically opposite--.

Signed and Sealed this

Fifth Day of March, 1991

Attest:

HARRY F. MANBECK, JR.

*Attesting Officer*  *Commissioner of Patents and Trademarks*